United States Patent
Odendall et al.

(10) Patent No.: US 7,210,284 B2
(45) Date of Patent: May 1, 2007

(54) METHOD FOR THE CONTROL OF THE SUPPLIED AIR/FUEL RATIO OF AN INTERNAL COMBUSTION ENGINE

(75) Inventors: Bodo Odendall, Neuburg (DE); Bernhard Pfalzgraf, Ingolstadt (DE)

(73) Assignee: Audi AG (DE)

( * ) Notice: Subject to any disclaimer, the term of this patent is extended or adjusted under 35 U.S.C. 154(b) by 0 days.

(21) Appl. No.: 11/197,308

(22) Filed: Aug. 5, 2005

(65) Prior Publication Data
US 2006/0032215 A1 Feb. 16, 2006

(30) Foreign Application Priority Data
Aug. 7, 2004 (DE) .................. 10 2004 038 482

(51) Int. Cl.
*F01N 3/00* (2006.01)
(52) U.S. Cl. .................. 60/285; 60/276; 60/299
(58) Field of Classification Search .......... 60/274, 60/276, 277, 285, 299
See application file for complete search history.

(56) References Cited

U.S. PATENT DOCUMENTS

| | | | |
|---|---|---|---|
| 5,678,402 A * | 10/1997 | Kitagawa et al. | 60/276 |
| 5,842,340 A * | 12/1998 | Bush et al. | 60/274 |
| 5,848,528 A * | 12/1998 | Liu | 60/274 |
| 5,901,552 A * | 5/1999 | Schnaibel et al. | 60/274 |
| 6,151,888 A * | 11/2000 | Schneider et al. | 60/274 |

FOREIGN PATENT DOCUMENTS

| | | |
|---|---|---|
| DE | 196 06 652 B4 | 2/2004 |
| DE | 103 57 415 A1 | 7/2004 |

* cited by examiner

*Primary Examiner*—Thomas Denion
*Assistant Examiner*—Diem Tran
(74) *Attorney, Agent, or Firm*—Stevens, Davis, Miller & Mosher, LLP

(57) ABSTRACT

In a method for the control of the supplied air/fuel ratio of an internal combustion engine (1) with a catalytic converter (5) which is located in the exhaust gas line (2) with an integrated oxygen reservoir (6), it is suggested that the air/fuel ratio be controlled as a function of at least one parameter of the internal combustion engine (1), at least one parameter of the catalytic converter (5), and/or as a function of the type and amount of the exhaust gas emissions currently occurring, in order to optimize the speed for adjustment of the admission or discharge of oxygen in the oxygen reservoir (6) contained in the catalytic converter (5) for favorable conversion of the exhaust gas emissions during transient operation of the internal combustion engine (1) and after deviations from the air/fuel ratio $\lambda=1$. As claimed in the invention, a "disturbance" of the exhaust gas composition which occurs during transient operation of the internal combustion engine (1) is corrected with a speed which takes into account both the current conversion demand by the catalytic converter (5) and also the current conversion performance of the catalytic converter (5) and thus makes possible improved overall exhaust gas conversion.

10 Claims, 3 Drawing Sheets

METHOD FOR THE CONTROL OF THE SUPPLIED AIR/FUEL RATIO OF AN INTERNAL COMBUSTION ENGINE

CROSS-REFERENCE TO RELATED APPLICATIONS

This application claims priority from German Application No. 102004038482.7, filed Aug. 7, 2004.

BACKGROUND

This invention relates to a method for the control of the supplied air/fuel ratio of an internal combustion engine with a catalytic converter which is located in the exhaust gas line, with an integrated oxygen reservoir.

Generally the air/fuel ratio which is supplied to an internal combustion engine is easily controlled such that a constant lambda value of approximately 1 is maintained in order to convert the emissions which occur in the exhaust gas specifically hydrocarbon and carbon monoxide on the one hand and nitrogen oxides on the other, at any time with good efficiency. This constant lambda control is however not always optimum since the exhaust gas composition can change greatly, especially in transient operation of the internal combustion engine.

Document DE 198 11 257 A1 discloses a process for controlling the exhaust gas aftertreatment of a DI-spark ignition and lean engine, for determining the charging state of the nitrogen oxide reservoir of a catalytic converter the exhaust gas temperature being measured, which together with the other parameters of engine operation, such as for example the transpired time since switching to lean operation, the oxygen content of exhaust gas and the torque fluctuation of the engine, constitutes a measure for the degree of charging of the nitrogen oxide reservoir.

Document DE 103 40 633 A1 describes an exhaust gas emission control means for an internal combustion engine with a three-way catalytic converter and an air/fuel variation element. There the air/fuel ratio is forcibly changed between rich and lean depending on the amount of carbon monoxide stored in the three-way catalytic converter.

Document DE 101 03 772 A1 shows a process for operating a three-way catalytic converter with an oxygen reservoir, the air/fuel mixture which is supplied to the internal combustion engine being controlled such that the oxygen reservoir of the catalytic converter is kept in a middle setpoint range between a minimum degree of filling and a maximum degree of filling. The drift of the degree of filling can be checked there by making the air/fuel mixture richer and leaner in alternation.

SUMMARY OF THE INVENTION

In this context, the object of this invention is to make available a process for controlling the air/fuel ratio which is supplied to the internal combustion engine, which can be used especially in a catalytic converter with an oxygen reservoir and which takes into account the respective conversion demand by the catalytic converter or the respective conversion capacity of the catalytic converter, so that especially in transient operation of the internal combustion engine, compared to the prior art, much improved conversion of the emissions contained in the exhaust gas is achieved.

This object is achieved by the air/fuel ratio being controlled as a function of at least one parameter of the internal combustion engine, at least one parameter of the catalytic converter, and/or as a function of the type and amount of exhaust gas emissions occurring, in order to optimize the speed for adjusting the admission or discharge of oxygen in the oxygen reservoir which is contained in the catalytic converter for favorable conversion of the exhaust gas emissions during transient operation of the internal combustion engine or after deviations from the air/fuel ratio $\lambda=1$.

If the internal combustion engine is operating in the transient operating range, in particular the control of the air/fuel ratio as a function of the type and amount of emissions which occur and on the parameters of the catalytic converter is advantageous in order to optimize the speed for adjusting the admission or discharge of oxygen in the oxygen reservoir. This is because the activity of the oxygen reservoir, i.e., its ability to be filled with oxygen or to be emptied of oxygen, depends primarily on the type and amount of exhaust gas emissions which occur and on the aging of the catalytic converter. High activity of the oxygen reservoir during filling or emptying allows a high speed, while low activity of the oxygen reservoir during filling and emptying allows a low speed without undesirable overshoots or poor exhaust gas conversion occurring due to overly rapid or overly pronounced correction of the air/fuel ratio.

The air/fuel ratio should be controlled in particular for small masses of exhaust gas to be within an allowable range of approximately 0.8 to 1.2 and for increasing masses of exhaust gas it should be reduced such that the speed for adjustment of the admission or discharge of oxygen in the oxygen reservoir contained in the catalytic converter and the deviation from $\lambda=1$ operation are limited. Thus even if disturbances which are greater or which last a longer time must be corrected and if the oxygen reservoir of the catalytic converter is completely emptied or completely filled, efficient operation of the internal combustion engine is maintained in any case.

Preferably the air/fuel ratio is controlled such that the speed for adjustment of the admission or discharge of oxygen in the oxygen reservoir contained in the catalytic converter is limited to a maximum value. In this way, even for different exhaust gas masses it is ensured that the speed of admission or discharge of oxygen in the oxygen reservoir is kept constant and that the maximum value which is allowable for optimum operation of the catalytic converter is not exceeded.

The air/fuel ratio is especially preferably controlled such that the maximum value of the speed for adjustment of the admission or discharge of oxygen in the oxygen reservoir contained in the catalytic converter is changed depending on at least one parameter of the catalytic converter. This at least one parameter of the catalytic converter represents the aging of the catalytic converter so that when the air/fuel ratio is being controlled it can be taken into account that a new or fully serviceable catalytic converter allows a higher speed of admission or discharge than an older catalytic converter with only limited activity.

Preferably the air/fuel ratio is controlled such that the speed for adjustment of the admission or discharge of oxygen in the oxygen reservoir contained in the catalytic converter is changed depending on the current degree of filling of the oxygen reservoir and the deviation of the current degree of filling from the setpoint of the degree of oxygen filling. This is because the oxygen reservoir can emptied most quickly at a maximum degree of filling of approximately 100% and emptying takes place only slowly at a medium degree of filling of 50% and less, while filling of the oxygen reservoir takes place very rapidly at a minimum degree of filling of 0% and at a medium degree of filling of 50% and more can take place only slowly.

It is advisable to take the engine speed and/or load into account as the parameters of the internal combustion engine. This is because these parameters provide information about when for example small amounts of hydrocarbon and carbon monoxide and large amounts of nitrogen oxides are present, so that the oxygen reservoir should be operated with little filling, or when for example large amounts of hydrocarbon and carbon monoxide and small amounts of nitrogen oxides are present, so that the oxygen reservoir should be operated with higher filling in order to achieve more favorable conversion of the respective predominating emissions.

The degree of thermal aging of the catalytic converter, the degree of its poisoning and its temperature can be taken into account as the parameters of the catalytic converter. The current state of the catalytic converter can be easily determined by these parameters so that the oxygen reservoir integrated into it can be operated with optimum filling according to its remaining storage capacity. Optimum filling corresponds to approximately half of the existing reservoir capacity so that for transient operation of the internal combustion engine both for filling and also emptying of the oxygen reservoir a maximum volume is kept in readiness.

The type and amount of exhaust gas emissions currently occurring can be taken into account not only indirectly by way of the operating parameters of the internal combustion engine, but also directly by way of at least one exhaust gas probe located in the exhaust line, and especially hydrocarbon, carbon monoxide, nitrogen oxides and oxygen in the exhaust gas should be detected so that the major fluctuations which occur during transient operation of the internal combustion engine can again be promptly compensated. Thus, for example, the admission of oxygen which occurs during the coasting mode of the internal combustion engine can be directly recognized and then can be immediately cleared out again or the discharge of oxygen which occurs during the increased richness of full load operation of the internal combustion engine can be recognized and then refilled.

Preferably the relationship between the air/fuel ratio for optimization of the speed for adjustment of the admission or discharge of oxygen in the oxygen reservoir contained in the catalytic converter for favorable conversion of the exhaust gas emissions and at least one parameter of the internal combustion engine, at least one parameter of the catalytic converter, and/or the type and amount of currently occurring exhaust gas emissions is stored in a number of engine characteristics maps. Thus the selected control variables can be individually weighted before they are ultimately incorporated into the control of the air/fuel ratio.

BRIEF DESCRIPTION OF THE DRAWINGS

This invention is detailed below using the following drawings, in which.

DETAILED DESCRIPTION OF THE INVENTION

Figure 1:
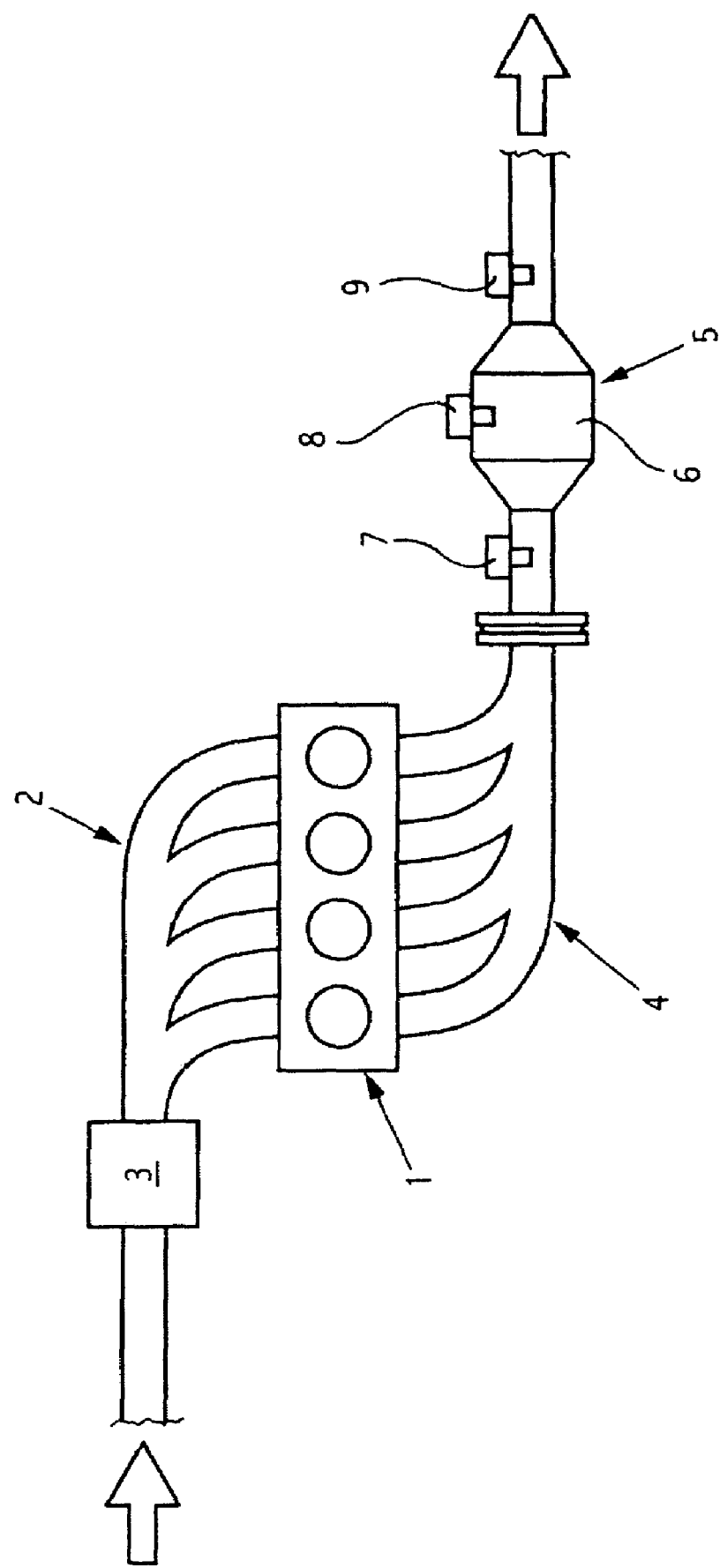
FIG. 1 shows a schematic of an internal combustion engine which operates using the process as claimed in the invention.

FIG. 1 shows an internal combustion engine 1 with a control means 3 located in the intake line 2 for control of the air/fuel ratio supplied to the internal combustion engine 1 and with a catalytic converter 5 which is located in the exhaust line 4 and which has an integrated oxygen reservoir 6 for conversion of the exhaust gas emissions.

The control means 3 is connected by way of different signal lines to the internal combustion engine 1, the catalytic converter 5 and diverse exhaust gas probes 7, 8, 9 so that when the air/fuel ratio is being controlled at least one parameter of the internal combustion engine 1, such as for example the engine speed or the load, at least one parameter of the catalytic converter 5, such as for example the degree of its thermal aging, the degree of its poisoning or its temperature, and/or the type and amount of the exhaust gas emissions currently occurring, such as hydrocarbon, carbon monoxide, nitrogen oxides and/or oxygen, can be taken into account. Depending on one or more of these quantities the air/fuel ratio can then be controlled such that an optimum degree of filling OSC of the oxygen reservoir 6 of the catalytic converter 5 is reached.

Figure 2A:
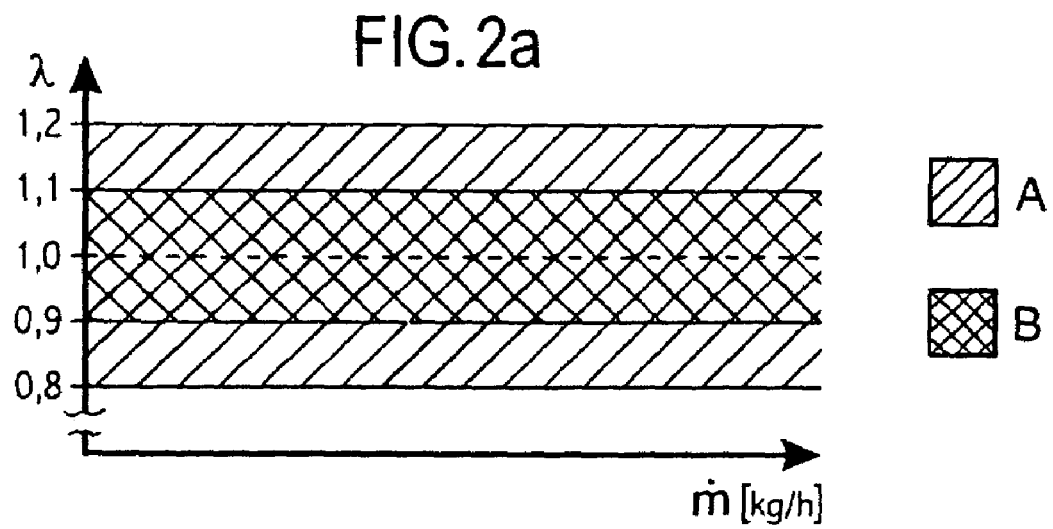
FIGS. 2a, 2b, 2c show various controls of the air/fuel ratio for optimizing the speed for admission or discharge of oxygen in the oxygen reservoir of the catalytic converter plotted over the mass flow of the exhaust line.

FIG. 2a shows that the air/fuel ratio is controlled such that the speed V for adjusting the admission or discharge of the oxygen in the oxygen reservoir 6 contained in the catalytic converter 5 is limited by the air/fuel ratio supplied to the internal combustion engine 1 even after a disturbance of steady-state operation or after a deviation from the air/fuel ratio $\lambda=1$ always lying within a given allowable range regardless of the mass flow m which is routed through the exhaust line 4. For a new, fully serviceable catalytic converter 5 the allowable range A shown crosshatched extends from approximately 0.8 to 1.2 and for an older, no longer fully serviceable catalytic converter 5 the crosshatched allowable range B extends from approximately 0.9 to 1.1.

Figure 2B:
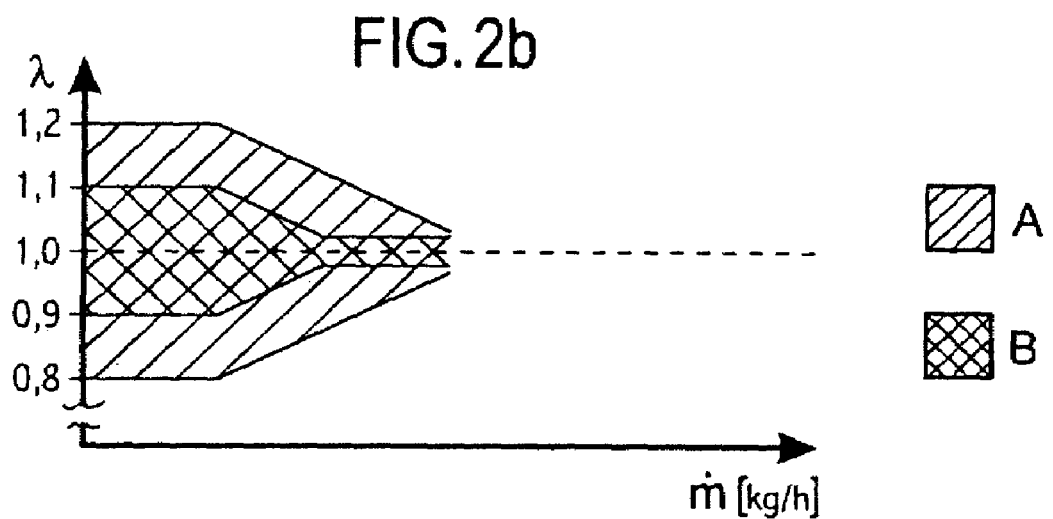
Figure 2C:
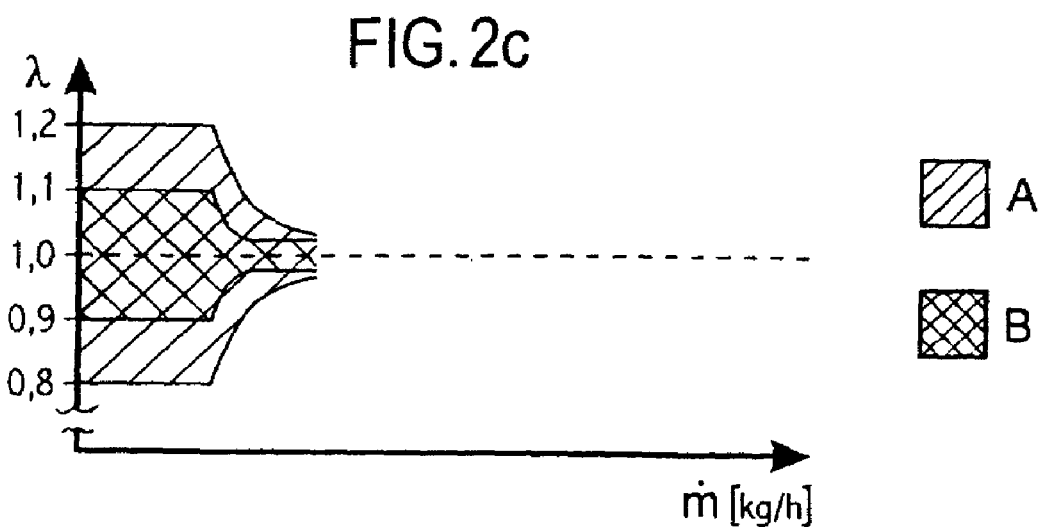

FIGS. 2b and 2c show that the air/fuel ratio is controlled such that the speed V for adjusting the admission or discharge of oxygen in the oxygen reservoir 6 is limited to a maximum value, this maximum value corresponding to an initial value which is predetermined by the type of catalytic converter 5 and by its efficiency when new. This maximum value can be changed depending on at least one parameter of the catalytic converter 5 in order to take into account the aging of the catalytic converter 5.

According to the first embodiment from FIG. 2b, the air/fuel ratio is controlled such that the speed V for adjusting the admission or discharge of oxygen in the oxygen reservoir 6 contained in the catalytic converter 5 is kept constant proceeding from the maximum value, so that the mass flow m which is routed in the exhaust line 4 is taken into account. In the process the characteristic of the air/fuel ratio depicts a straight line which bends from the maximum value.

Figure 3A:
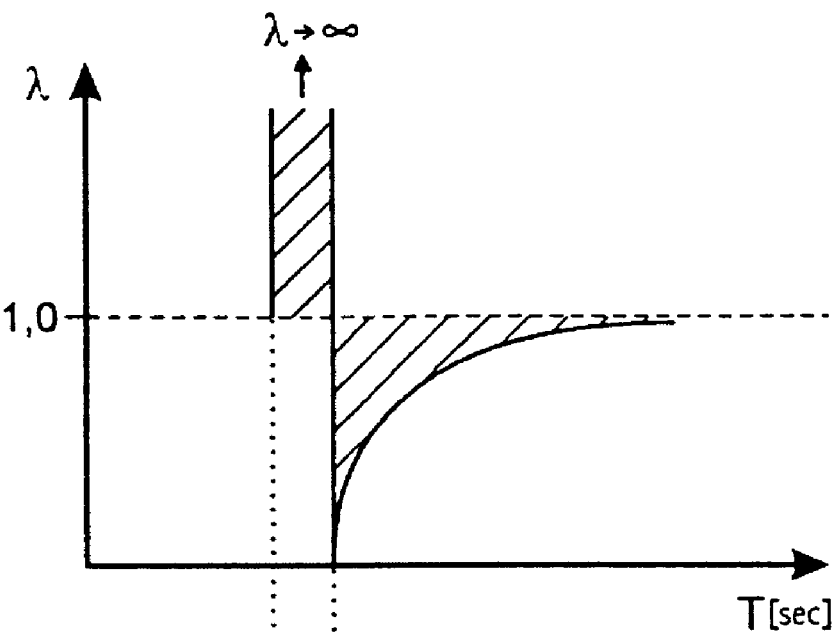
FIG. 3a shows control of the air/fuel ratio undertaken for a "disturbance" for an optimized speed when the discharge of oxygen from the oxygen reservoir is adjusted, plotted over time.
Figure 3B:
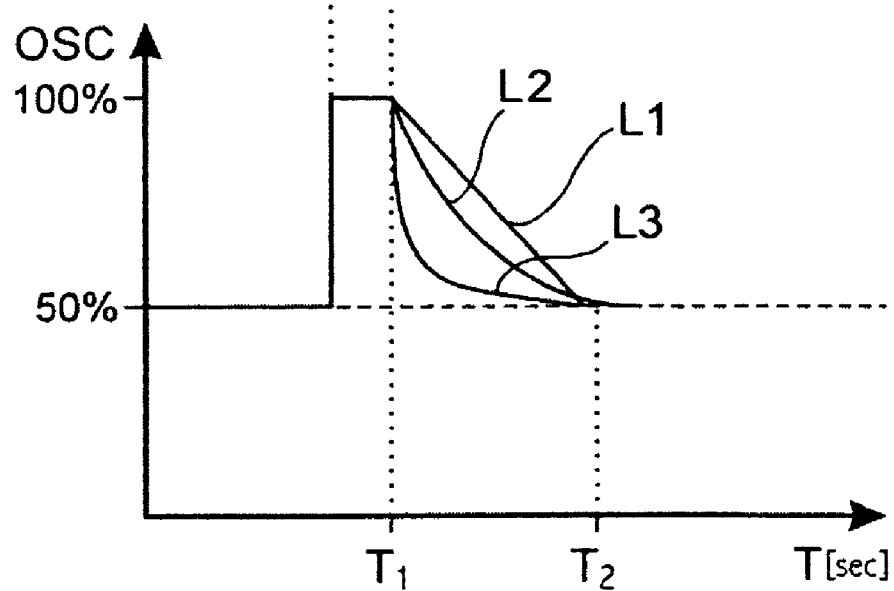
FIGS. 3b shows the characteristic of the current degree of filling of the oxygen reservoir which occurs in the control from FIG. 3, plotted over time.
Figure 3C:
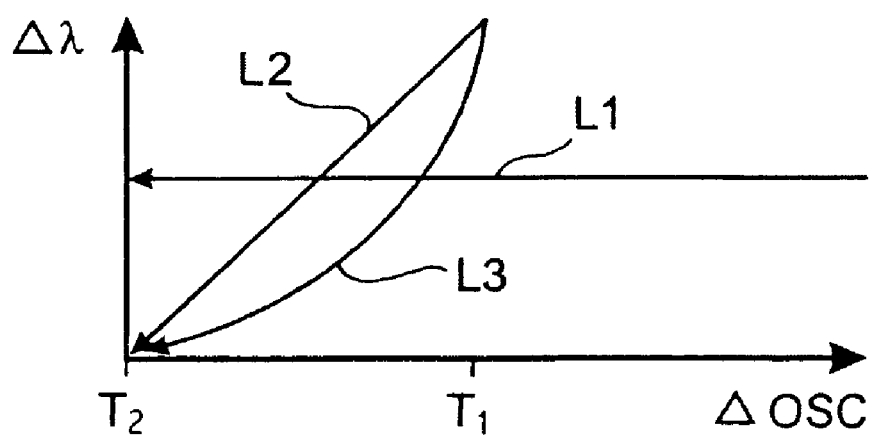
FIGS. 3c shows the difference of the air/fuel ratio at $\lambda=1$ over the difference of the oxygen reservoir from the setpoint of the oxygen reservoir.

And according to the second embodiment from FIGS. 2c and 3c the air/fuel ratio is controlled such that the speed V for adjusting the admission or discharge of oxygen in the oxygen reservoir 6 contained in the catalytic converter 5 is changed as a function of the current degree of filling OSC of the oxygen reservoir 6. In this way not only the mass flow m which is routed in the exhaust line, but also the respective deviation from the setpoint of the oxygen charging state of the oxygen reservoir 6 are taken into account. The characteristic of the air/fuel ratio depicts a parabola-like curve which proceeds from a maximum value.

Analogously to FIG. 2*a*, in FIGS. 2*b* and 2*c* for a new, fully serviceable catalytic converter 5 a first allowable range A' and A" and for an older, no longer fully serviceable catalytic converter 5 a second allowable range B' or B" of the air/fuel ratio are shown crosshatched.

FIG. 3*a* shows a transient operating state, for example a coasting mode, the air/fuel ratio being plotted over time T. There an air/fuel ratio $\lambda \gg 1$ or $\lambda$ approaches $\infty$ occurs so that the oxygen reservoir 6 integrated into the catalytic converter 5 is completely charged. Immediately after this "disturbance" by the coasting mode the oxygen reservoir will be emptied again to an optimum value of approximately 50% of its degree of filling OSC so that favorable conversion of the exhaust emissions is achieved again as quickly as possible. To this end, a rich air/fuel ratio $\lambda < 1$ is set and the air/fuel ratio $\lambda$ with optimized speed is guided toward 1 when the discharge of oxygen from the oxygen reservoir 6 contained in the catalytic converter 5 is adjusted.

FIG. 3*b* shows the same transient operating state of the internal combustion engine 1, the degree of filling OSC of the oxygen reservoir 6 being plotted over time T and the speed V of admission or discharge of oxygen from the oxygen reservoir according to line 1 being constant, according to line 2 being linearly dependent on the current degree of filling OSC of the oxygen reservoir 6 and according to line 3 being quadratically dependent on the current degree of filling OSC of the oxygen reservoir 6.

In another transient operating state, specifically in full load operation, an air/fuel ratio $\lambda < 1$ would briefly occur so that the oxygen reservoir 6 contained in the catalytic converter 5 would optionally be completely emptied. Therefore the oxygen reservoir 6 would then have to be refilled again immediately after the "disturbance" by full load operation to a degree of filling OSC of approximately 50%, for which a lean air/fuel ratio $\lambda > 1$ would be set and the air/fuel ratio $\lambda$ with optimized speed V would be guided towards 1. Graphically this would correspond to mirroring of the curve from FIG. 3*a* on the line $\lambda = 1$ or OSC=50%.

FIG. 3*c* finally shows the difference of the air/fuel ratio at $\lambda = 1$ over the difference of the current degree of oxygen filling from the setpoint of the degree of oxygen filling, emptying the oxygen reservoir following the direction of the arrow each time. This indicates that for a large difference of the degree of oxygen filling $\Delta OSC$ there is also a great difference of the air/fuel ratio $\Delta \lambda$. Line 1 corresponds to a constant speed of admission or discharge of oxygen, line 2 to a speed which is linearly dependent on the current degree of filling OSC of the oxygen reservoir, and line 3 corresponds to a speed which is quadratically dependent on the oxygen reservoir OSC.

LIST OF REFERENCE NUMBERS

1 internal combustion engine
2 intake line
3 control means
4 exhaust line
5 catalytic converter
6 oxygen reservoir
7,8,9 exhaust probes
A,A', A" allowable range of the air/fuel ratio for a new catalytic converter
B,B', B" allowable range of the air/fuel ratio for an older catalytic converter

The invention claimed is:

1. A process for the control of the supplied air/fuel ratio of an internal combustion engine with a catalytic converter which is located in the exhaust gas line, with an integrated oxygen reservoir, comprising
controlling the air/fuel ratio as a function of at least one parameter of the internal combustion engine, at least one of one parameter of the catalytic converter, and as a function of the type and amount of the exhaust gas emissions which are currently occurring, in order to optimize the speed for adjustment of the admission or discharge of oxygen in the oxygen reservoir contained in the catalytic converter for favorable conversion of the exhaust gas emissions during transient operation of the internal combustion engine and after deviations from the air/fuel ratio $\lambda = 1$ utilizing data from a first exhaust gas probe positioned upstream from the oxygen reservoir, a second exhaust gas probe positioned at least partially in the oxygen reservoir and a third exhaust gas probe positioned downstream of the oxygen reservoir.

2. The process as claimed in claim 1, wherein the dependent relationship between the air/fuel ratio for optimization of the speed for adjustment of the admission or discharge of the oxygen in the oxygen reservoir contained in the catalytic converter for favorable conversion of the exhaust gas emissions and at least one of one parameter of the internal combustion engine, at least one parameter of the catalytic converter, and the type and amount of exhaust gas emissions currently occurring is stored in a plurality of engine characteristics maps.

3. A process for the control of the supplied air/fuel ratio of an internal combustion engine with a catalytic converter which is located in the exhaust gas line, with an integrated oxygen reservoir, comprising
controlling the air/fuel ratio as a function of at least one parameter of the internal combustion engine, at least one of one parameter of the catalytic, converter and as a function of the type and amount of the exhaust gas emissions which are currently occurring, in order to optimize the speed for adjustment of the admission or discharge of oxygen in the oxygen reservoir contained in the catalytic converter for favorable conversion of the exhaust gas emissions during transient operation of the internal combustion engine and after deviations from the air/fuel ratio $\lambda = 1$, wherein the air/fuel ratio is controlled for small masses of exhaust gas to be within an allowable range of approximately 0.8 to 1.2 and for increasing masses of exhaust gas it is reduced such that the speed for adjustment of the admission or discharge of oxygen in the oxygen reservoir contained in the catalytic converter is limited.

4. A process for the control of the supplied air/fuel ratio of an internal combustion engine with a catalytic converter which is located in the exhaust gas line, with an integrated oxygen reservoir, comprising
controlling the air/fuel ratio as a function of at least one parameter of the internal combustion engine, at least one of one parameter of the catalytic converter, and as a function of the type and amount of the exhaust gas emissions which are currently occurring, in order to optimize the speed for adjustment of the admission or discharge of oxygen in the oxygen reservoir contained in the catalytic converter for favorable conversion of the exhaust gas emissions during transient operation of the internal combustion engine and after deviations from the air/fuel ratio λ=1, wherein the air/fuel ratio is controlled such that the speed for adjustment of the admission or discharge of oxygen in the oxygen reservoir contained in the catalytic converter is limited to a maximum value.

5. The process as claimed in claim 4, wherein the air/fuel ratio is controlled such that the maximum value of the speed for adjustment of the admission or discharge of oxygen in the oxygen reservoir contained in the catalytic converter is changed depending on at least one parameter of the catalytic converter.

6. The process as claimed in claim 4, wherein the air/fuel ratio is controlled such that the speed for adjustment of the admission or discharge of oxygen in the oxygen reservoir contained in the catalytic converter takes place depending on the current degree of filling of the oxygen reservoir.

7. A process for the control of the supplied air/fuel ratio of an internal combustion engine with a catalytic converter which is located in the exhaust gas line, with an integrated oxygen reservoir, comprising controlling the air/fuel ratio as a function of at least one parameter of the internal combustion engine, at least one of one parameter of the catalytic converter, and as a function of the type and amount of the exhaust gas emissions which are currently occurring, in order to optimize the need for adjustment of the admission or discharge of oxygen in the oxygen reservoir contained in the catalytic converter for favorable conversion of the exhaust gas emissions during transient operation of the internal combustion engine and after deviations from the air/fuel ratio λ=1, wherein the air/fuel ratio is controlled for small masses of exhaust gas to be within an allowable range of approximately 0.8 to 1.2 and for increasing masses of exhaust gas it is reduced such that the speed for adjustment of the admission or discharge of oxygen in the oxygen reservoir contained in the catalytic converter is limited, wherein the load is taken into account as the parameters of the internal combustion engine.

8. A process for the control of the supplied air/fuel ratio of an internal combustion engine with a catalytic converter which is located in the exhaust gas line, with an integrated oxygen reservoir, comprising controlling the air/fuel ratio as a function of at least one parameter of the internal combustion engine, at least one of one parameter of the catalytic converter, and as a function of the type and amount of the exhaust gas emissions which are currently occurring, in order to optimize the speed for adjustment of the admission or discharge of oxygen in the oxygen reservoir contained in the catalytic converter for favorable conversion of the exhaust gas emissions during transient operation of the internal combustion engine and after deviations from the air/fuel ratio λ=1, wherein the air/fuel ratio is controlled for small masses of exhaust gas to be within an allowable range of approximately 0.8 to 1.2 and for increasing masses of exhaust gas it is reduced such that the speed for adjustment of the admission or discharge of oxygen in the oxygen reservoir contained in the catalytic converter is limited, wherein at least one of the degree of thermal aging of the catalytic converter, and its temperature are taken into account as its parameters.

9. A process for the control of the supplied air/fuel ratio of an internal combustion engine with a catalytic converter which is located in the exhaust gas line, with an integrated oxygen reservoir, comprising controlling the air/fuel ratio as a function of at least one parameter of the internal combustion engine, at least one of one parameter of the catalytic converter, and as a function of the type and amount of the exhaust gas emissions which are currently occurring, in order to optimize the speed for adjustment of the admission or discharge of oxygen in the oxygen reservoir contained in the catalytic converter for favorable conversion of the exhaust gas emissions during transient operation of the internal combustion engine and after deviations from the air/fuel ratio λ=1, wherein the air/fuel ratio is controlled for small masses of exhaust gas to be within an allowable ratio of approximately 0.8 to 1.2 and for increasing masses of exhaust gas it is reduced such that the speed for adjustment of the admission or discharge of oxygen in the oxygen reservoir contained in the catalytic converter is limited, wherein at least one of hydrocarbon (HC), carbon monoxide (CO), and nitrogen oxides (NOx), are taken into account in the type of the currently occurring exhaust gas emissions.

10. The process of claim 9, wherein the change in exhaust gas components is taken into account.

* * * * *